US009577469B2

(12) United States Patent
Ju

(10) Patent No.: US 9,577,469 B2
(45) Date of Patent: Feb. 21, 2017

(54) BATTERY PACK

(75) Inventor: Ri-A Ju, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 736 days.

(21) Appl. No.: 13/620,434

(22) Filed: Sep. 14, 2012

(65) Prior Publication Data

US 2013/0154371 A1 Jun. 20, 2013

Related U.S. Application Data

(60) Provisional application No. 61/576,622, filed on Dec. 16, 2011.

(51) Int. Cl.
*H02J 1/00* (2006.01)
*H02J 3/14* (2006.01)
*H02J 7/14* (2006.01)
*H02J 7/00* (2006.01)

(52) U.S. Cl.
CPC ............ *H02J 7/1461* (2013.01); *H02J 7/0011* (2013.01); *H02J 7/0029* (2013.01); *H02J 2007/004* (2013.01); *H02J 2007/0037* (2013.01); *Y10T 307/406* (2015.04)

(58) Field of Classification Search
CPC ...... H02J 7/0011; H02J 7/1461; H02J 7/0029; H02J 2007/0037; H02J 2007/004; H02J 7/0031; H02J 7/0083; Y10T 307/406
See application file for complete search history.

(56) References Cited

U.S. PATENT DOCUMENTS

| | | | |
|---|---|---|---|
| 5,777,454 A * | 7/1998 | McAndrews | G01R 31/3658 307/64 |
| 6,326,771 B1 * | 12/2001 | Popescu-Stanesti | H02J 7/0068 320/139 |
| 7,533,746 B2 | 5/2009 | Yamaguchi | |
| 7,683,585 B1 | 3/2010 | Johnson et al. | |
| 2007/0032915 A1 * | 2/2007 | Yamaguchi | 701/1 |

(Continued)

FOREIGN PATENT DOCUMENTS

| CN | 102237546 A | 11/2011 |
|---|---|---|
| JP | 2011-229353 | 11/2011 |

(Continued)

OTHER PUBLICATIONS

European Search Report dated Aug. 8, 2014 of the corresponding European Patent Application No. 12187132.1, noting listed references in this IDS (7 pages).

(Continued)

*Primary Examiner* — Rexford Barnie
*Assistant Examiner* — Rasem Mourad
(74) *Attorney, Agent, or Firm* — Lewis Roca Rothgerber Christie LLP

(57) ABSTRACT

A battery pack includes first and second terminals, a battery unit electrically connected between the first and second terminals, the battery unit being configured to receive charging power, and being configured to output discharging power, and a power converter electrically coupled between the first terminal and the battery unit, the power converter being configured to convert the charging power to have a charging voltage corresponding to the battery unit, wherein the first and second terminals are configured to be electrically coupled to a generator and a starter motor.

18 Claims, 10 Drawing Sheets

(56) References Cited

U.S. PATENT DOCUMENTS

| | | | |
|---|---|---|---|
| 2008/0224661 A1* | 9/2008 | Onose | 320/115 |
| 2009/0179578 A1* | 7/2009 | Yang | 315/250 |
| 2010/0201318 A1 | 8/2010 | Sugiyama et al. | |
| 2010/0225276 A1 | 9/2010 | Sugiyama et al. | |
| 2011/0043170 A1* | 2/2011 | Kim | H01M 10/425 320/136 |
| 2011/0140648 A1* | 6/2011 | Lee | 320/101 |
| 2011/0140673 A1* | 6/2011 | Zhang | H02J 7/0029 320/145 |
| 2011/0227540 A1* | 9/2011 | Kanoh | H02J 7/345 320/135 |
| 2011/0262797 A1 | 10/2011 | Kim | |
| 2011/0304299 A1* | 12/2011 | Yang | H02J 7/045 320/107 |
| 2012/0051757 A1* | 3/2012 | Nishino et al. | 398/201 |
| 2012/0105008 A1* | 5/2012 | Lipcsei | H02J 7/0031 320/134 |

FOREIGN PATENT DOCUMENTS

| | | |
|---|---|---|
| KR | 10-2009-0109366 A | 10/2009 |
| KR | 10-2010-0004024 A | 1/2010 |
| KR | 10-2011-0062051 A | 6/2011 |
| KR | 10-2011-0097241 A | 8/2011 |
| WO | WO 2011/069162 A1 | 6/2011 |

OTHER PUBLICATIONS

Patent Abstracts of Japan and full English Translation of Japanese Publication No. 2011-229353.
SIPO Office action dated Dec. 31, 2015, with English translation, for corresponding Chinese Patent application 201210459289.4, (24 pages).

* cited by examiner

BATTERY PACK

CROSS-REFERENCE TO RELATED APPLICATION

This application claims priority to and the benefit of U.S. Provisional Application No. 61/576,622, filed on Dec. 16, 2011, in the USPTO, the disclosure of which is incorporated herein in its entirety by reference.

BACKGROUND

Field

One or more embodiments of the present invention relate to a battery pack.

Related Art

Unlike primary batteries, secondary batteries (e.g., rechargeable batteries) may be charged and discharged. A second battery may be a single battery, or a plurality of secondary batteries coupled to form a single battery module may be used, according to the type of an applied external device.

A lead storage battery may be a power supply for starting up an engine (e.g., an engine of a vehicle). Recently, an idle stop & go (ISG) system for improving fuel efficiency has been increasingly used. Despite the output properties and despite frequent starting-up of a power supply for supporting an ISG system for restricting a no-load operation, the discharge properties of the power supply should be maintained over time, and a long lifetime of the power supply should be ensured. However, since an engine of a typical lead storage battery is repeatedly stopped and started under an ISG system, the charge and discharge properties of the lead storage battery may deteriorate, and the lead storage battery might not be useful over a long period of time.

SUMMARY

One or more embodiments of the present invention include a battery pack whose charging and discharging properties do not cause excessive deterioration of the battery pack, and whose relatively long lifetime is ensured.

One or more embodiments of the present invention include a battery pack that is appropriately used as a power supplier of an idle stop & go (ISG) system.

According to one or more embodiments of the present invention, a battery pack includes first and second terminals, a battery unit electrically connected between the first and second terminals, the battery unit being configured to receive charging power, and being configured to output discharging power, and a power converter electrically coupled between the first terminal and the battery unit, the power converter being configured to control the charging power to the battery unit to prevent over-charging of the battery unit, wherein the first and second terminals are configured to be electrically coupled to a generator and a starter motor.

The power converter may be a direct current to direct current (DC-DC) converter that is configured to convert the charging power to have a charging voltage corresponding to the battery unit.

The power converter may include a switching element configured to be controlled by pulse-width modulation corresponding to a state of the battery unit.

The power converter may include at least one diode.

The starter motor may be configured to receive the discharging power, and to provide starting power for starting an engine.

The generator may be configured to convert mechanical energy into electrical energy during operation of the engine, and may be configured to supply the charging power to the first and second terminals.

The battery pack may further include a first current limiter electrically coupled in parallel to the power converter between the first terminal and the battery unit, and the first current limiter may be configured to limit the charging power.

The first current limiter may be on a discharging path bypassing the power converter.

The first current limiter may include a plurality of diodes to lower a voltage drop.

The battery pack may further include a second current limiter electrically coupled to the power converter, and the second current limiter may be configured to limit the charging power.

The second current limiter may include a resistive device.

The battery unit may include a first battery module, a second battery module, and a third battery module electrically coupled in series.

The battery pack may further include a bus bar including a first bus bar electrically coupling first electrodes of the first battery module to each other, a second bus bar electrically coupling second electrodes of the first battery module and first electrodes of the second battery module to each other, a third bus bar electrically coupling second electrodes of the second battery module and first electrodes of the third battery module to each other, and a fourth bus bar electrically coupling second electrodes of the third battery module to each other.

The battery pack may further include a connecting terminal extending to an outside of a cover of the battery pack.

The connecting terminal may include a first connecting terminal electrically coupled to the first bus bar, a second connecting terminal electrically coupled to the second bus bar, a third connecting terminal electrically coupled to the third bus bar, and a fourth connecting terminal electrically coupled to the fourth bus bar.

Each of the battery modules may include a plurality of battery cells, a restrainer configured to surround a first end portion of the battery cells of the battery module and both lateral surfaces of the battery cells of the battery module, and an end plate configured to be coupled to the restrainer at a second end portion of the battery cells of the battery module.

The end plate may include flange portions having a wing shape on two lateral surfaces of the end plate, and the flange portions may be configured to be coupled to respective end portions of the restrainer by a coupling member.

The battery pack may further include a base frame, and a position aligning unit on the base frame, the position aligning unit corresponding to one of the battery modules.

The position aligning unit may be configured to isolate neighboring ones of the battery modules from each other with an isolation gap therebetween.

The power converter may include a bidirectional converter further configured to convert the discharging power to have a discharging voltage corresponding to the first terminal and to convert the charging power from the first terminal to have a charging voltage corresponding to the battery unit.

According to one or more embodiments of the present invention, the charging and discharging properties may barely deteriorate the components of the battery pack, the output properties of the battery pack may be maintained, and a relatively long lifetime of the battery pack may be maintained. Thus, the battery pack may be appropriately used as a power supplier for starting up an engine under an idle stop & go (ISG) system.

In particular, according to one of more embodiments of the present invention, the battery pack is designed according to an input/output specification to satisfy a voltage level required by a starter motor or other electrical components, or to start up an engine of a conventional generating module, and thus the battery pack may replace a conventional lead storage battery used in a conventional power system.

DETAILED DESCRIPTION

Hereinafter, a battery pack of embodiments of the present invention will be described with regard to exemplary embodiments of the invention with reference to the attached drawings.

Figure 1:
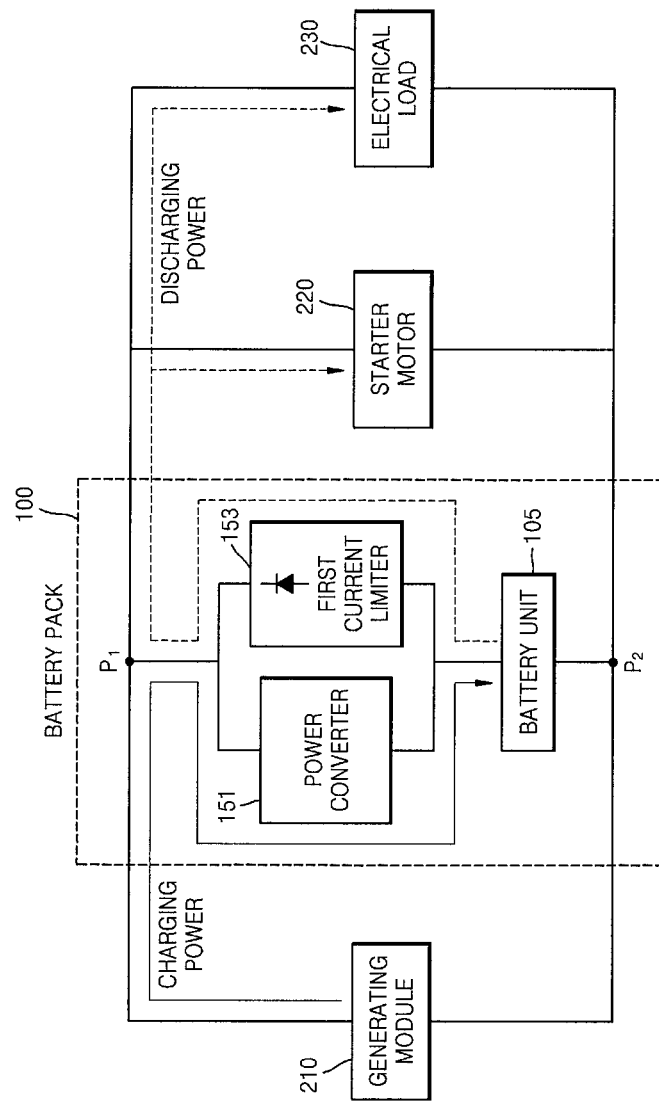
FIG. 1 is a schematic diagram of a battery pack according to an embodiment of the present invention.

FIG. 1 is a schematic diagram of a battery pack 100 according to an embodiment of the present invention, and shows the battery pack 100 coupled to an external peripheral device.

The battery pack 100 is coupled to first and second terminals P1 and P2, and includes a battery unit 105 between the first and second terminals P1 and P2 for receiving charging power, and for outputting discharging power. The battery pack 100 may be electrically coupled in parallel to a generating module 210 and a starter motor 220 via the first and second terminals P1 and P2.

The battery pack 100 may receive and store charging power generated by the generating module 210, and may supply discharging power to the starter motor 220. For example, the generating module 210 may be power-coupled to an engine (not shown), and may be coupled to an operational axis of the engine to convert rotational power/rotational energy into electrical energy, which may be output. In this case, the charging power generated from the generating module 210 may be stored in the battery unit 105 through the first and second terminals P1 and P2 of the battery pack 100. For example, the generating module 210 may include a direct current (DC) generator, an alternating current (AC) generator, a rectifier, and/or the like, and may generate a DC voltage of about 15V, for example, a DC voltage of about 14.6 V to about 14.8 V.

For example, the starter motor 220 may be operated when the engine is started up, and may provide initial rotational power for rotating the rotational axis of the engine. For example, the starter motor 220 may receive the stored power through the first and second terminals P1 and P2 of the battery pack 100, and may rotate the rotational axis of the engine when the engine is initially started up, or when the engine is started up again after an idle stop. The starter motor 220 may be operated when the engine is started up. During operation of the engine started up by the starter motor 220, the generating module 210 may be driven to generate charging power.

For example, the battery pack 100 may act as a power supply for starting up the engine of the ISG system having an ISG function for improving fuel efficiency. As the engine of the ISG system is repeatedly stopped and started, the battery pack 100 is repeatedly charged and discharged.

Since a lead storage battery applied to a typical ISG system is repeatedly charged and discharged, a service life of the lead storage battery may be reduced, and the charging and discharging properties of the lead storage battery may deteriorate. For example, as the lead storage battery is repeatedly charged and discharged, start capability of the engine may deteriorate, and the lead storage battery may be frequently exchanged or replaced.

For example, because the battery unit 105 may include a lithium ion battery that has charging and discharging properties that are relatively constantly maintained, and hardly (e.g., do not significantly) deteriorate over the service time (e.g., when compared to a lead storage battery), the battery unit 105 may be appropriately applied to the ISG system whose engine is repeatedly stopped and started. The battery unit 105 of the present embodiment may have low weight and improved fuel efficiency when compared to a lead storage battery having the same discharge capacity. In addition, the battery unit 105 of the present embodiment may have a smaller volume than that of a conventional lead storage battery, thereby reducing a loading space. However, the battery unit 105 of the present embodiment is not limited to a lithium ion battery, and may be, for example, a nickel metal hydride battery (NiMH) or the like.

An electrical load 230 may be coupled to the battery pack 100, along with the generating module 210 and the starter motor 220. The electrical load 230 may consume power stored in the battery pack 100, may receive stored discharge power through the first and second terminals P1 and P2, and may include various electrical components.

The battery pack 100 may include a power converter 151 for converting the charging power supplied from the generating module 210 to have a voltage level appropriate for (e.g., required by) the battery unit 105. Further, for example, the power converter 151 may be in a charging path between the first terminal P1 and the battery unit 105, and may convert a voltage of the first terminal P1 into a voltage level appropriate (or suitable) for the battery unit 105 (for example, a rated charging voltage appropriate for, or required by, the battery unit 105). Throughout this specification, a voltage (e.g., a predetermined voltage) of the battery unit 105, a voltage level appropriate for (e.g., required by) the battery unit 105, and/or a voltage (e.g., a predetermined voltage) set by the battery unit 105 may refer to a rated charging voltage of the battery unit 105.

Figure 4:
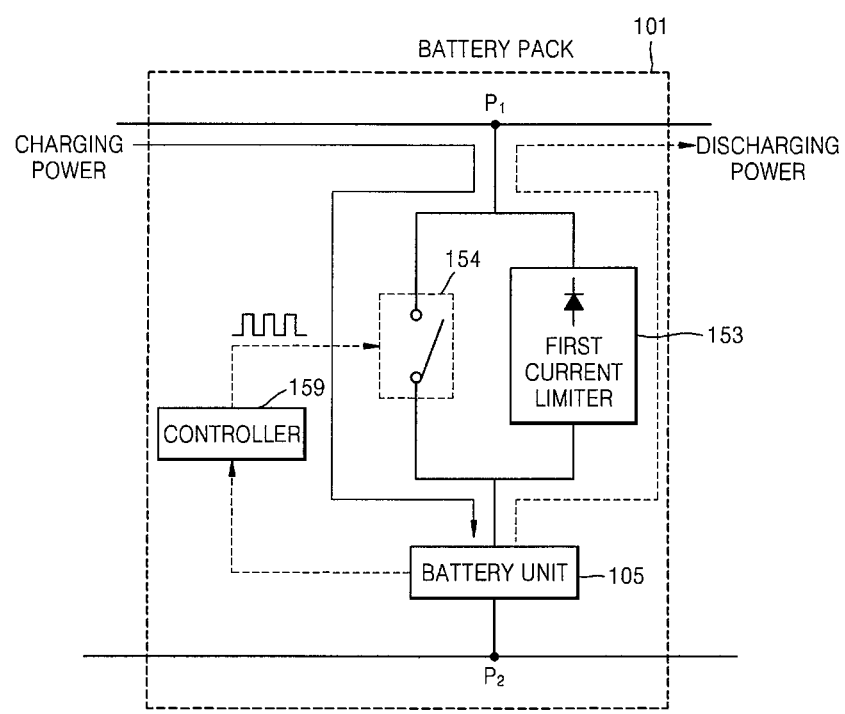
FIGS. 4 through 6 are schematic diagrams of battery packs according to other embodiments of the present invention.
Figure 5:
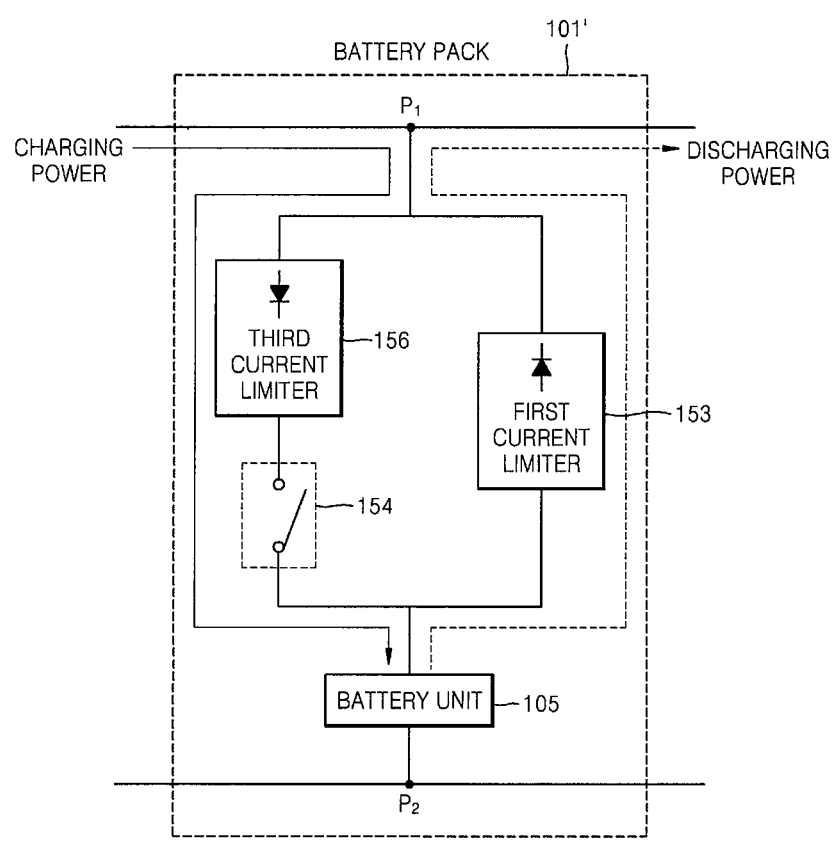

In the present embodiment, the power converter 151 may be, for example, a voltage converter, a power linking unit, or a switching element (e.g., see FIGS. 4 and 5). The power converter 151 may also be embodied as a buck-type converter and may include, for example, an inductor, a capacitor, a diode, a switch device, and/or the like.

For example, when a DC voltage level output from the generating module 210 is from about 14.6 V to about 14.8 V, and when a DC rated charging voltage of the battery unit 105 is about 12.6 V, the power converter 151 may DC-DC convert a DC voltage between about 14.6 V and about 14.8 to a DC voltage of about 12.6 V, and may supply the converted power to the battery unit 105. A voltage band output from the generating module 210 is converted into a voltage level appropriate (or suitable) for the battery unit 105 (e.g., appropriate for the specifications of the battery unit 105) through the power converter 151, and thus, a conventional generating module may be used without being redesigned. By setting a voltage of the battery unit 105 to 12.6 V, a voltage range (e.g., about 12 V) appropriate (or suitable) for the starter motor 220 or the electrical load 230 may be satisfied.

The battery unit 105 may include a plurality of battery cells (not shown) that are coupled in series or in parallel, and that may adjust a rate charging voltage and a charging capacity by combining serial and parallel connections. For example, the battery unit 105 may be set to have a voltage of 12.6 V by coupling a plurality of battery cells in series and/or in parallel. As described below, the battery unit 105 may be configured such that three parallel modules (e.g., three separate modules M1, M2, and M3 of FIG. 8) each having a voltage of 4.2 V are coupled in series, and thus, the battery unit 105 may be set to have a voltage of 12.6 V. Although the term "parallel modules" is used in this specification, the modules may be electrically connected in parallel and/or in series.

The rated charging voltage of the battery unit 105 may be set to be lower than a voltage level output from the generating module 210, that is, a voltage of the first terminal P1. This is because the battery unit 105 is fully charged from charging power output from the generating module 210 and a charging capacity of about 100% is used.

For example, when the battery unit 105 is set to have a voltage of 16.8 V by coupling four parallel modules having a voltage of 4.2 V in series, since a voltage of 16.8 V is higher than a voltage of 15 V output from the generating module 210, only about 50% of a charging capacity of the battery unit 105 may be used. As described above, when four parallel modules are coupled in series, charging efficiency of the battery unit 105 may be reduced. In addition, because the number of batteries is increased, manufacturing costs may be increased, and fuel efficiency of a vehicle using the batteries may be reduced due to a heavy weight of the batteries. Thus, a product according to an embodiment of the present invention may be manufactured by coupling three parallel modules in series.

The battery pack 100 may further include a first current limiter 153 coupled in parallel to the power converter 151 between the first terminal P1 and the battery unit 105. The first current limiter 153 may block or limit charging power supplied to the battery unit 105 (e.g., by blocking the charging power from using a path for the discharging power). In addition, discharging power of the battery unit 105 may bypass the power converter 151 to supply the discharging power to the starter motor 220 and/or the electrical load 230.

The first current limiter 153 may include a diode that allows discharging power supplied from the battery unit 105 to have a forward direction, and that allows charging power stored in the battery unit 105 to have a reverse direction. For example, the first current limiter 153 may include a plurality of diodes that are coupled in parallel to each other, thereby reducing a voltage drop in discharging power passing through the first current limiter 153.

Figure 2:
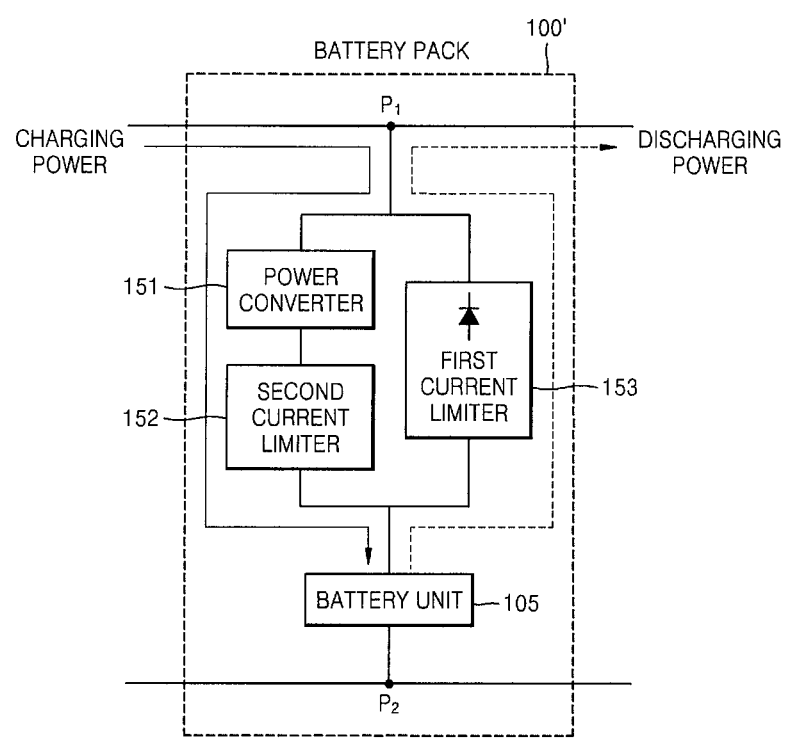
FIG. 2 is a schematic diagram of a battery pack according to another embodiment of the present invention.

FIG. 2 shows a schematic structure of a battery pack 100' according to another embodiment of the present invention. As shown in FIG. 2, a second current limiter 152 may be coupled in series between the first terminal P1 and the battery unit 105. In more detail, the second current limiter 152 may be coupled between the power converter 151 and the battery unit 105.

The second current limiter 152 may limit a charging current supplied to the battery unit 105 to be equal to or less than a given level (e.g., a predetermined level). If an excessive amount of charging current instantly flows to the battery unit 105 or the power converter 151, the battery unit 105 or the power converter 151 may malfunction, or a protective device (not shown) of the power converter 151 may operate so that a charging operation may be stopped. For example, the second current limiter 152 may include a resistance device. According to another embodiment of the present invention, the second current limiter 152 may maintain a charging current at a constant level (e.g., a substantially constant level) to charge the battery unit 105 by using a constant current charging method.

Figure 3:
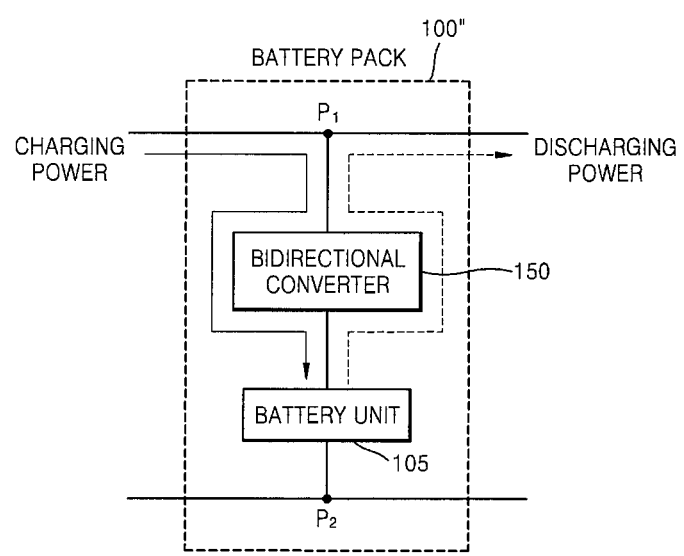
FIG. 3 is a schematic diagram of a battery pack according to another embodiment of the present invention.

FIG. 3 shows a schematic structure of a battery pack 100" according to another embodiment of the present invention. As shown in FIG. 3, a bidirectional converter 150 may be coupled between the first terminal P1 and the battery unit 105. The bidirectional converter 150 may DC-DC convert a charging voltage applied to the battery unit 105 (e.g., a voltage at the first terminal P1) into a voltage level appropriate (or suitable) for the battery unit 105. On the other hand, the bidirectional converter 150 may DC-DC convert discharging power output from the battery unit 105 to a voltage of the first terminal P1. According to the present embodiment, both charging power and discharging power may be converted through the bidirectional converter 150. However, the bidirectional converter 150 may be configured such that a charging path and a discharging path may be separated from each other through an internal circuit, for example, a switch device or the like.

FIG. 4 shows a schematic structure of a battery pack 101 according to another embodiment of the present invention. As shown in FIG. 4, a charging switch unit 154 may be coupled in series between the first terminal P1 and the battery unit 105.

The charging switch unit 154 may open and close a charging path for the battery unit 105. For example, the charging switch unit 154 may include a power switch, such as a bipolar junction transistor (BJT), a metal oxide semiconductor field effect transistor (MOSFET), an insulated gate bipolar transistor (IGBT), a relay, an open/close apparatus, or the like.

The charging switch unit 154 may operate based on a voltage of the battery unit 105 or a charge state, such as a state of charge (SOC), and may open or close the charging path according to a pulse width modulation (PWM) control signal having alternate on/off sections. Charging power charged in the battery unit 105 may be controlled in real time by adaptively controlling a duty ratio, for example, a ratio of 'on' sections per period of the PWM control signal applied to the charging switch unit 154 according to the charge state of the battery unit 105.

For example, as a charge level of the battery unit 105 increases, the duty ratio of the PWM control signal is continually reduced. Lastly, when the battery unit 105 reaches a full-charge state, for example, when the voltage of the battery unit 105 reaches a reference voltage or a maximum voltage (e.g., a predetermined maximum voltage), the charging switch unit 154 may be switched off to prevent the battery unit 105 from being overcharged and to protect the battery unit 105. For example, as the charge level of the battery unit 105 increases, the duty ratio of the PWM control signal applied to the charging switch unit 154 is continually reduced and lastly approaches zero (0), and thus, the charging switch unit 154 may be maintained in an off state. The charging power may be gradually reduced according to the charging level of the battery unit 105, and thus, a discontinuous change in a power flow, which occurs momentarily when the charging switch unit 154 is switched off (for example, ripple voltage or ripple current), may be prevented. Accordingly, various electrical components inside the battery pack 101 may be protected.

The battery pack 101 of FIG. 4 may further include a controller 159, which may control a charging operation of the battery unit 105 by monitoring the voltage of the battery unit 105 or the charge state of the battery unit 105, such as a SOC, by generating a PWM control signal of which a duty ratio is adjusted according to the monitoring result, and by outputting the PWM control signal.

In FIG. 4, the battery unit 105 may be prevented from being overcharged by adaptively controlling charging power according to the charge state of the battery unit 105 by using the charging switch unit 154 that has a relatively simple structure and does not use a separate power converter. In addition, the battery unit 105 may be rapidly charged without being affected by the behavior characteristics, such as charge delay of a power converter, by omitting the power converter from a charging path of the battery unit 105.

The first current limiter 153 that is coupled in parallel to the charging switch unit 154 may be between the first terminal P1 and the battery unit 105. The first current limiter 153 may block or limit charging power stored in the battery unit 105. In addition, discharging power of the battery unit 105 may bypass the charging switch unit 154 to supply the discharging power to the starter motor 220 and/or the electrical load 230.

The first current limiter 153 may include a diode that allows discharging power supplied from the battery unit 105 to have a forward direction, and allows charging power stored in the battery unit 105 to have a reverse direction. For example, the first current limiter 153 may include a plurality of diodes coupled in parallel to each other, thereby reducing a voltage drop in discharging power passing through the first current limiter 153.

FIG. 5 shows a schematic structure of a battery pack 101' according to another embodiment of the present invention. As shown in FIG. 5, a third current limiter 156 may be coupled between the first terminal P1 and the battery unit 105. In more detail, the third current limiter 156 may be coupled in series between the first terminal P1 and the charging switch unit 154.

The third current limiter 156 may block or limit discharging power supplied from the battery unit 105 via a charging path of the battery unit 105, and may allow charging power stored in the battery unit 105 to pass therethrough. The third current limiter 156 may include a diode that allows the charging power stored in the battery unit 105 to have a forward direction, and that allows the discharging power supplied from the battery unit 105 to have a reverse direction.

Figure 6:
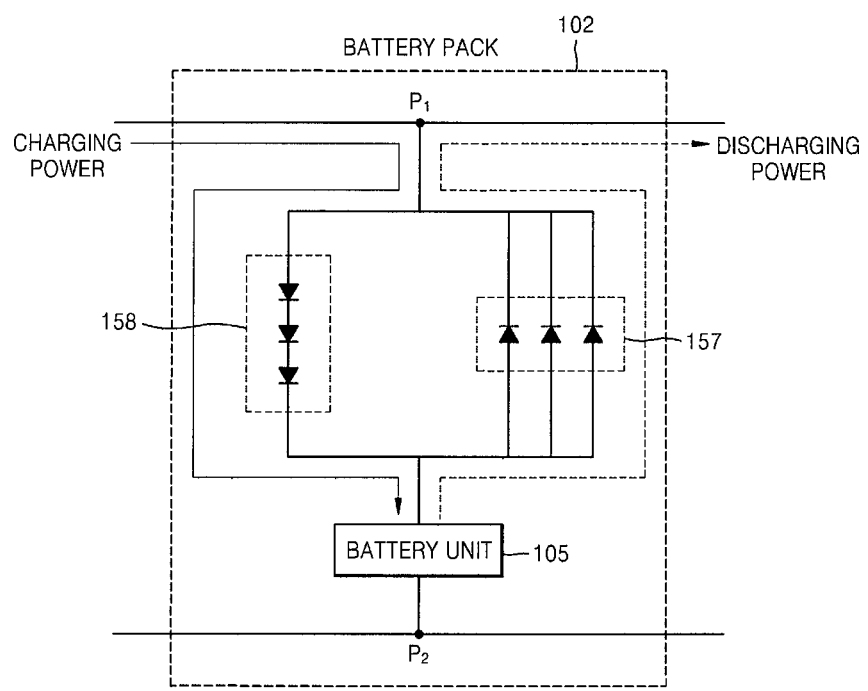

FIG. 6 shows a schematic structure of a battery pack 102 according to another embodiment of the present invention. As shown in FIG. 6, the battery pack 102 may include fourth and fifth current limiters 157 and 158 that are coupled in parallel to each other between the first terminal P1 and the battery unit 105. The fourth and fifth current limiters 157 and 158 may limit the direction of electrical current on charging and discharging paths of the battery unit 105, respectively. The fifth current limiter 158 may also be a power converter according to other embodiments of the present invention.

The fourth current limiter 157 may block or limit the charging power to be stored in the battery unit 105 from the discharging path of the battery unit 105. In addition, discharging power of the battery unit 105 may bypass the fifth current limiter 158, thereby passing through the fourth current limiter 157 to supply the discharging power to the starter motor 220 and/or the electrical load 230. The fourth current limiter 157 may include a diode that allows discharging power supplied from the battery unit 105 to have a first direction (e.g., a forward direction), and that allows charging power that is to be stored in the battery unit 105 to have a second direction (e.g., a reverse direction). For example, the fourth current limiter 157 may include a plurality of diodes that are coupled in parallel to each other, thereby reducing a voltage drop in discharging power passing through the fourth current limiter 157.

The fifth current limiter 158 may block or limit the discharging power supplied from the battery unit 105 from the charging path of the battery unit 105. In addition, charging power stored to be stored in the battery unit 105 may bypass the fourth current limiter 157, and may pass through the fifth current limiter 158 to be supplied to the battery unit 105. The fifth current limiter 158 may include a diode that allows charging power to be stored in the battery unit 105 to have a first direction (e.g., a forward direction), and that allows discharging power supplied from the battery unit 105 to have a second direction (e.g., a reverse direction). The fifth current limiter 158 may include a plurality of diodes that are coupled in series to each other. Thus, the diodes may reduce a voltage drop in charging power passing through the fifth current limiter 158, and may convert a voltage applied from the generating module 210 into a voltage level appropriate (e.g., suitable) for the battery unit 105. For example, when the fifth current limiter 158 includes a plurality of diodes that are coupled in series to each other, an appropriate number of diodes may be coupled in series to each other so as to cause a voltage drop by as much as a voltage difference between a voltage (e.g., about DC 14.6 V to about DC 14.8 V) applied from the generating module 210 and a voltage (e.g., about DC 12.6 V) appropriate for the battery unit 105.

In FIG. 6, the likelihood of the battery unit 105 being overcharged may be reduced by causing a voltage drop using a diode having a relatively simple structure, and without using a power converter on a charging path.

A discontinuous change in a power flow, which may occur due to switching between on and off states of a switch device (for example, ripple voltage or ripple current) may be prevented by omitting the switch device from the charging path of the battery unit 105, thereby protecting various electrical components inside the battery pack 102, and improving a lifetime of the battery pack 102.

Figure 7:
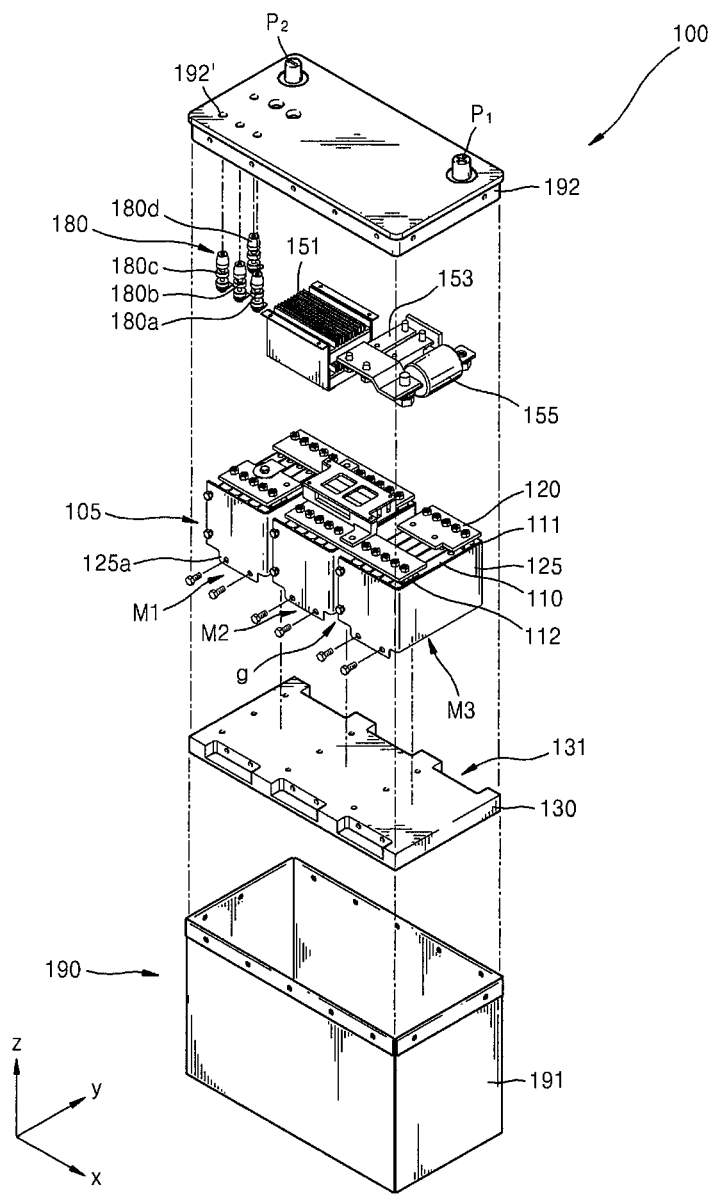
FIG. 7 is an exploded perspective view of a battery pack according to another embodiment of the present invention.

FIG. 7 is an exploded perspective view of a battery pack 100 according to another embodiment of the present invention. As shown in FIG. 7, the battery pack 100 may include the battery unit 105 for performing charging and discharging operations, and a battery housing 190 for housing the battery unit 105 and for forming an outer appearance.

The battery unit 105 of the present embodiment includes a plurality of battery cells 110 that are arranged in rows, and a bus bar 120 for coupling the battery cells 110 in series and/or in parallel. The bus bar 120 may extend across the battery cells 110, and may be coupled to first or second electrodes 111 and 112 of the battery cells 110. The battery cells 110 may each have a secondary battery such as, for example, a lithium ion battery, and also may have, for example, an approximately rectangular shape.

For example, the battery unit 105 may include a plurality of separate/parallel modules M1, M2, and M3 that are arranged in a direction (e.g., the x-axis direction of FIG. 7) in which the battery cells 110 are arranged. The parallel modules M1, M2, and M3 may each include the battery cells 110 coupled in parallel. In addition, by coupling a number (e.g., a predetermined number) of the parallel modules M1, M2, and M3 in series, a voltage of the battery unit 105 may be obtained as an appropriate level (e.g., a required level). For example, the battery unit 105 may include three parallel modules M1, M2, and M3 each having a voltage of 4.2 V. The parallel modules M1, M2, and M3 may be coupled in series, and thus a voltage of the battery unit 105 may be obtained as about 12.6 V.

The parallel modules M1, M2, and M3 may be assembled by being respectively inserted into, installed upon, or aligned with, position aligning units 131 on a base frame 130. The base frame 130 may support the parallel modules M1, M2, and M3, and may define assembly positions of the parallel modules M1, M2, and M3. The base frame 130 may allow the parallel modules M1, M2, and M3 to be coupled with each other to constitute a combined module. The base frame 130 may also serve as a heat dissipating plate for dissipating heat generated during charging and discharging of the battery cells 110 of the parallel modules M1, M2, and M3. With regard to the assembly positions of the parallel modules M1, M2, and M3, the parallel modules M1, M2, and M3 may be assembled and spaced from each other with an isolation gap 'g' therebetween. That is, the parallel modules M1, M2, and M3 may be assembled and spaced apart from each other by the isolation gap 'g' in the direction (e.g., the x-axis direction of FIG. 7) in which the battery cells 110 are arranged. In addition, the isolation gap 'g' may prevent the parallel modules M1, M2, and M3 from thermally interfering with each other (e.g., by reducing or preventing heat conduction and/or heat buildup among the parallel modules M1, M2, and M3).

The position aligning units 131 of the base frame 130 may each be formed to have a groove shape. Corresponding units (e.g., corresponding tabs) 125a of the parallel modules M1, M2, and M3 may be inserted into the position aligning units 131, respectively. As described later, the parallel modules M1, M2, and M3 may include restrainers 125 for surrounding arrays of the battery cells 110, respectively. Sides of the restrainers 125 may protrude downward to form the corresponding units 125a.

The battery housing 190 for housing the battery unit 105 may include a case 191 for housing the battery unit 105 and a cover member 192. An upper opening of the case 191 for housing the battery unit 105 may be covered by the cover member 192, thereby forming a sealing space of the battery unit 105 that is insulated from an external environment.

The first and second terminals P1 and P2 providing electrical contact points with an external peripheral device are formed on the battery housing 190. For example, the first and second terminals P1 and P2 may be formed through the cover member 192, and may be electrically coupled to the battery unit 105. As described with reference to FIG. 1, the generating module 210, the starter motor 220, the electrical load 230, and the like may be coupled to the first and second terminals P1 and P2 as peripheral devices of the battery pack 100.

The first and second terminals P1 and P2 may be electrically coupled to the battery unit 105 through the power converter 151 or the first current limiter 153, which may be located on the battery unit 105 in an upward direction (e.g., the z-axis direction of FIG. 7). For example, charging power that is supplied through the first and second terminals P1 and P2 may be supplied to the battery unit 105 through the power converter 151. Discharging power output from the battery unit 105 may be externally supplied through the first current limiter 153 and the first and second terminals P1 and P2. The power converter 151 and the first current limiter 153 may be located on the battery unit 105, and may be housed in a remaining (or spare) space of the battery housing 190 for accommodating the battery unit 105.

A safety device 155 may be located on the battery unit 105. For example, the safety device 155 may limit or block charging and discharging currents during a malfunction such as, for example, overheating, an excessive current, or the like. The safety device 155 may include, for example, a positive temperature coefficient (PTC), a fuse, a current blocking device, or the like.

A connecting terminal 180 may be located on the battery unit 105. The connecting terminal 180 may be electrically coupled to two ends of each of the parallel modules M1, M2, and M3 to measure a voltage of each of the parallel modules M1, M2, and M3, or may be coupled to an external charger (not shown) to supply charging power directly to the parallel modules M1, M2, and M3. The connecting terminal 180 may include four connecting terminals 180a, 180b, 180c, and 180d for measuring a first voltage between two ends of the first parallel module M1, a second voltage between two ends of the second parallel module M2, and a third voltage between two ends of the third parallel module M3, that is, a first connecting terminal 180a, a second connecting terminal 180b, a third connecting terminal 180c, and a fourth connecting terminal 180d. The connecting terminal 180 may be formed to be exposed outside the battery housing 190 through a through hole 192' formed in the battery housing 190 (e.g., in the cover member 192).

Figure 8:
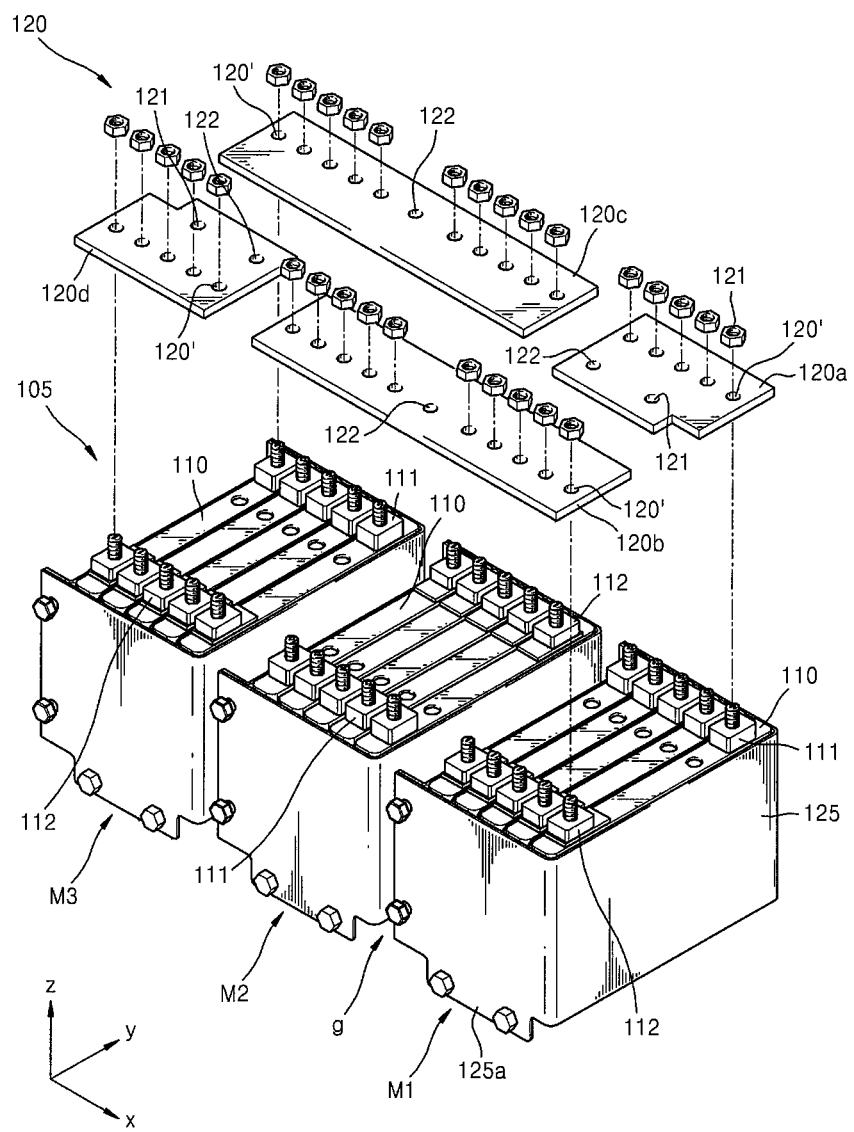
FIG. 8 is an exploded perspective view of the battery unit of the embodiment shown in FIG. 7.

FIG. 8 shows the battery unit 105 of the embodiment shown in FIG. 7 in detail. As shown in FIG. 8, the battery unit 105 may include the parallel modules M1, M2, and M3 electrically coupled by the bus bar 120, which may have a connection structure including parallel and/or series connections. For example, the battery unit 105 may include three parallel modules M1, M2, and M3 coupled in series. In this case, the parallel modules M1, M2, and M3 may each include five battery cells 110 respectively coupled in parallel. However, according to the present embodiment, the number of the battery cells 110 constituting the parallel modules M1, M2, and M3 is not limited to the above example. For example, three or more battery cells 110 may be used.

The bus bar 120 may couple the battery cells 110 in series and/or in parallel. The bus bar 120 may extend across upper portions of the battery cells 110 in the direction in which the battery cells 110 are arranged (e.g., the x-axis direction of FIG. 8) to electrically couple respective ones of the first and second electrodes 111 and 112 of the battery cells 110 of the parallel modules M1, M2, and M3 to each other. For example, the first and second electrodes 111 and 112 may be inserted into/through the bus bar 120 through a coupling hole 120', and the bus bar 120 may be fixed to the first and second electrodes 111 and 112 by a first connecting portion (s) 121 coupled to screw portions of the first and second electrodes 111 and 112.

Each of the battery cells 110 may include the first and second electrodes 111 and 112 having opposite polarities to each other. The first and second electrodes 111 and 112 may provide electrical connection for withdrawing discharging power stored in the battery cells 110, or may receive externally supplied charging power. Although not illustrated in the figures, the battery cells 110 may accommodate an electrode assembly having a stack structure including a positive electrode plate and a negative electrode plate that are respectively coupled to the first and second electrodes 111 and 112 with a separator interposed therebetween, or may accommodate an electrode assembly having a roll shape obtained by winding a separator, and a positive electrode plate and a negative electrode plate that are respectively coupled to the first and second electrodes 111 and 112, in the form of jelly roll.

The battery cells 110 may be arranged such that neighboring groups of the battery cells 110 constituting the parallel modules (e.g., M1 and M2, or M2 and M3) may have opposite patterns, or patterns that are reversed (e.g., reversed in the y-axis direction of FIG. 8). For example, one group of the battery cells 110 constituting the first parallel module M1, and another group of the battery cells 110 constituting the second parallel module M2 may have patterns that are reversed (e.g., reversed in the y-axis direction). Thus, the first and second electrodes 111 and 112 of the first parallel module M1, and the first and second electrodes 111 and 112 of the second parallel module M2 may be formed at positions that are reversed (e.g., reversed in the y-axis direction). In other words, the first electrodes 111 of the first parallel module M1 and the second electrodes 112 of the second parallel module M2 may be on the right side, while the second electrodes 112 of the first parallel module M1 and the first electrodes 111 of the second parallel module M1 may be on the left side, as shown in FIG. 8.

As such, one group of the battery cells 110 constituting the second parallel module M2 and another group of the battery cells 110 constituting the third parallel module M3 may be arranged to have patterns that are reversed (e.g., reversed in the y-axis direction). In addition, the first and second electrodes 111 and 112 of the second parallel module M2, and the first and second electrodes 111 and 112 of the third parallel module M3 may be formed at positions that are reversed (e.g., reversed the y-axis direction). In other words, the first electrodes 111 of the third parallel module M3 and the second electrodes 112 of the second parallel module M2 may be on the right side, as shown in FIG. 8.

Neighboring groups of the battery cells 110 of the parallel modules M1, M2, and M3 may be arranged to have patterns that are reversed (e.g., reversed in the y-axis direction) so that neighboring groups of the parallel modules M1, M2, and M3 may be coupled in series through the bus bar 120 extending in one direction (e.g., respective portions of the bus bar 120 being on a single side, such as the left or right side, of the parallel modules M1, M2, and/or M3).

The bus bar 120 may include a plurality of bus bars 120a, 120b, 120c, and 120d for coupling the first through third parallel modules M1, M2, and M3 in series and/or in parallel. In more detail, the bus bar 120 may include a first bus bar 120a that extends across first electrodes 111 of the first parallel module M1, a second bus bar 120b that extends across second electrodes 112 of the first parallel module M1 and the first electrodes 111 of the second parallel module M2 (the first and second bus bars 120a and 120b thereby coupling the battery cells 110 of the first module M1 in parallel while coupling the first and second parallel modules M1 and M2 in series), a third bus bar 120c that extends across the second electrodes 112 of the second parallel module M2 and the first electrodes 111 of the third parallel module M3, and a fourth bus bar 120d that extends across the second electrodes 112 of the third parallel module M3.

For example, the second bus bar 120b may couple the second electrodes 112 of the first parallel module M1 in parallel and may couple the first electrodes 111 of the second parallel module M2 in parallel. Also, the second bus bar 120b may couple the first parallel module M1 and the second parallel module M2 in series.

Similarly, the third bus bar 120c may couple the second electrodes 112 of the second parallel module M2 in parallel and may couple the first electrodes 111 of the third parallel module M3 in parallel. Also, the third bus bar 120c may couple the third parallel module M3 of the second parallel module M2 in series.

The first bus bar 120a and the fourth bus bar 120d may have a voltage potential between the two ends of the entire battery unit 105. Wiring (not shown) for the charging and discharging power may be coupled to the first connecting portions 121 of the first bus bar 120a and the fourth bus bar 120d. The first connecting portion 121 may be formed as a hole. A wiring terminal (not shown) having an O-ring may be coupled to the first connecting portion 121, which has a hole shape, by a coupling member (not shown).

A second connecting portion 122 is formed in each of the first through fourth bus bars 120a, 120b, 120c, and 120d. A wiring (not shown) for coupling the first through fourth connecting terminals 180a, 180b, 180c, and 180d (refer to FIG. 7) may be coupled to the second connecting portion 122. The second connecting portion 122 may be formed to have a hole shape. A wiring terminal (not shown) having an O-shape may be coupled to the second connecting portion 122, which has a hole shape, by a coupling member (not shown).

As described with reference to FIG. 7, the first through fourth connecting terminals 180a, 180b, 180c, and 180d may respectively measure a voltage of each of the parallel modules M1, M2, and M3, or may supply charging power directly to each of the parallel modules M1, M2, and M3.

For example, the first through fourth connecting terminals 180a, 180b, 180c, and 180d may be electrically coupled to the bus bars 120a, 120b, 120c, and 120d through the second connecting portion 122 of the first through fourth bus bars 120a, 120b, 120c, and 120d. For example, to measure a voltage of the second parallel module M2 or to independently charge the second parallel module M2, a voltage between the second and third bus bars 120b and 120c, which corresponds to a potential between two ends of the second parallel module M2, may be measured, or charging power may be supplied through the second and third bus bars 120b and 120c.

Figure 9:
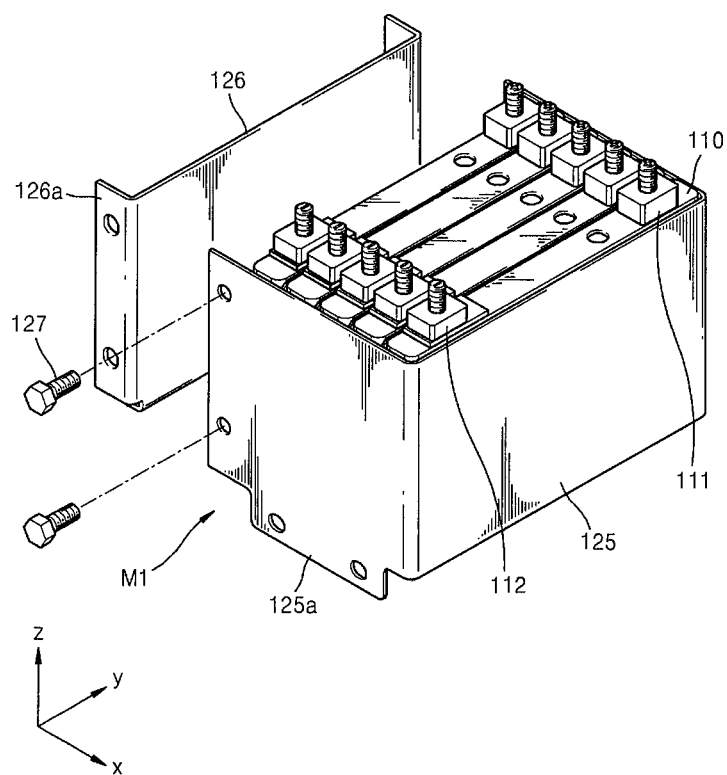
FIG. 9 shows a first parallel module of the embodiment shown in FIG. 8.

FIG. 9 shows the first parallel module M1 of the embodiment shown in FIG. 8 in detail, according to an embodiment of the present invention. For reference, technical features that will be described with reference to FIG. 9 may be applied to the second and third parallel modules M2 and M3, as well as to the first parallel module M1.

As shown in FIG. 9, the first parallel module M1 may include a restrainer 125 and an end plate 126 coupled to the restrainer 125, which are configured to surround the battery cells 110 that are arranged in a row.

The restrainer 125 may be formed to be adjacent, or to partially surround, one end portion and both lateral surfaces of the battery cells 110 that are arranged in a row, in the direction (e.g., the x-axis direction of FIG. 9) in which the battery cells 110 are arranged. In addition, the end plate 126 is adjacent the other end portion of the battery cells 110 in the direction (e.g., the x-axis direction), and the end plate 126 may be coupled to the restrainer 125. Thus, four surfaces of the group of the battery cells 110 arranged in a row may be confined by the restrainer 125 and the end plate 126, thereby efficiently preventing expansion of the battery cells 110.

The restrainer 125 may have a structure having a rectangular edge shape, which has an opening to accommodate two lateral surfaces and one end portion of the battery cells 110 arranged in a row. The end plate 126 may be placed at the other end portion of the battery cells 110 arranged in a row. Flange portions 126a of the end plate 126 having a wing shape may be formed on two lateral surfaces of the end plate 126. The flange portions 126a of the end plate 126 may be coupled to end portions of the restrainer 125 through a coupling member 127 when the flange portions 126a and end portions of the restrainer 125 overlap each other.

Figure 10:
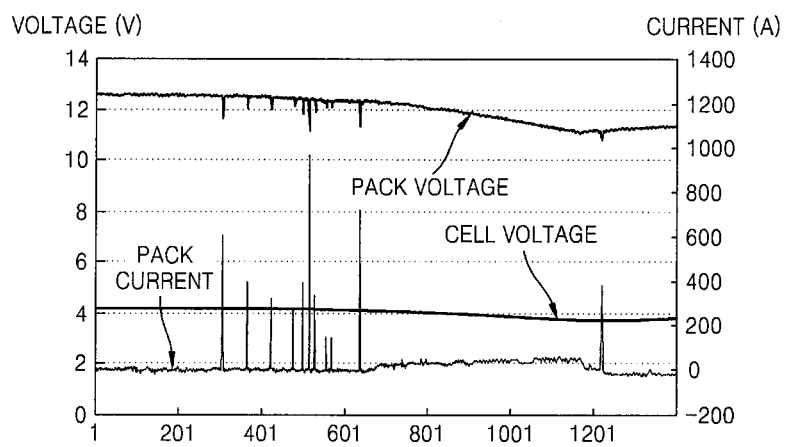
FIGS. 10 and 11 are graphs for showing experimental results obtained by evaluating charging properties before and after an engine is started when a battery pack is used, according to an embodiment of the present invention.
Figure 11:
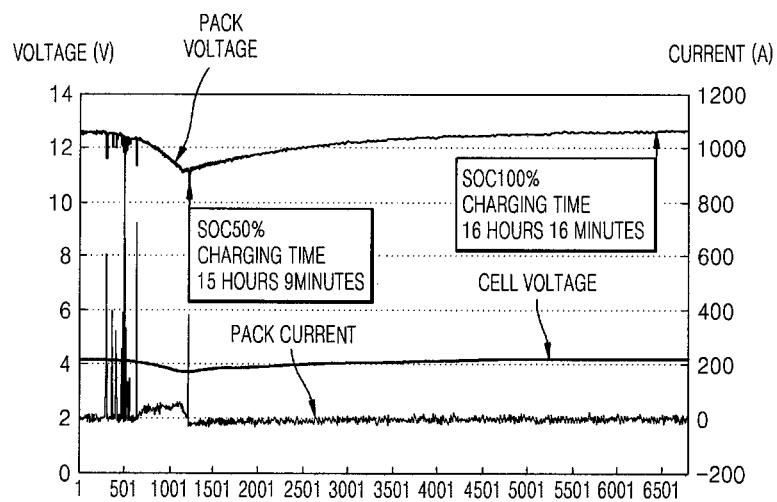

FIGS. 10 and 11 are graphs for showing experimental results obtained by evaluating charging properties before and after an engine is started when the battery pack 100 is used, according to an embodiment of the present invention.

In the engine-starting test of FIG. 10, a current (a pack current) of the battery unit 105, a voltage (a pack voltage) of the battery unit 105, and a voltage (a cell voltage) of the battery cells 110 were measured 11 times upon engine start up. Whenever the engine was started up, the current (the pack current) of the battery unit 105, that is, a discharging current, was instantly supplied to the starter motor 220 to exhibit a waveform having a pulse shape. A voltage of the battery unit 105 was instantly lowered. After the engine was started up, charging power was supplied through the generating module 210 so that a voltage of the battery unit 105 was recovered. As time passed, a voltage of the battery unit 105 was gradually lowered. This is because, after the engine was started up, the generating module 210 was stopped and the battery unit 105 was discharged, to allow a charging test of FIG. 11 to be performed.

In the charging test of FIG. 11, while a state of charge (SOC) was fully charged from 50% to 100%, a current (a pack current) of the battery unit 105, a voltage (a pack voltage) of the battery unit 105, and a voltage (a cell voltage) of the battery cells 110 were measured. With regard to the current (pack current) of the battery unit 105, it is confirmed that the current may be fully charged while a constant charging current is supplied and a time corresponding to 50% of SOC to 100% of SOC may be obtained. In the charging test, to evaluate the charging properties, the charging test was performed when the battery unit 105 was intentionally discharged to 50% of SOC. During start-up of a general engine, after the engine is started up, as the generating module 210 is operated, the battery unit 105 may be rapidly charged.

While embodiments of the present invention has been particularly shown and described with reference to exemplary embodiments thereof, it will be understood by one of ordinary skill in the art that various changes in form and details may be made therein without departing from the spirit and scope of the present invention as defined by the following claims, and their equivalents.

EXPLANATION OF SOME OF THE
REFERENCE CHARACTERS

| | |
|---|---|
| 100, 100', 100'', 101, 101', 102: battery pack | |
| 110: battery cell | 111: first electrode of battery cell |
| 112: second electrode of battery cell | 120: bus bar |
| 120a through 120d: first through fourth bus bars | |
| 120': coupling hole | 105: battery unit |
| 121: first connecting portion | 122: second first connecting portion |
| 125: restrainer | 125a: corresponding unit |
| 126: end plate | 126a: flange portion |
| 150: bidirectional converter | 151: power converter |
| 152: second current limiter | 153: first current limiter |
| 155: safety device | 180: connecting terminal |
| 180a through 180d: first through fourth connecting terminals | |
| 190: battery housing | |
| 191: case | 192: cover member |
| M1: first parallel module | M2: second parallel module |
| M3: third parallel module | g: isolation gap |

What is claimed is:

1. A battery pack comprising:
first and second terminals;
a battery unit electrically coupled between the first and second terminals, the battery unit being configured to receive charging power along a charging path, and being configured to output discharging power along a discharging path;
a power converter electrically coupled in series with the battery unit between the first terminal and the second terminal along the charging path, the power converter being configured to control the charging power to the battery unit to prevent over-charging of the battery unit;
a first current limiter electrically coupled in parallel with the power converter between the first terminal and the battery unit along the discharging path, the first current limiter being configured to limit the charging power along the discharging path; and
a second current limiter electrically coupled between the power converter and the battery unit along the charging path, the second current limiter being configured to limit the charging power to the battery unit along the charging path,
wherein the first and second terminals are configured to be electrically coupled to a generator and a starter motor.

2. A battery pack comprising:
First and second terminals; a battery unit electrically coupled between the first and second terminals, the battery unit being configured to receive charging power along a charging path, and being configured to output discharging power along a discharging path; a power converter electrically coupled in series with the battery unit between the first terminal and the second terminal along the charging path, the power converter being configured to control the charging power to the battery unit to prevent over-charging of the battery unit; a first current limiter electrically coupled in parallel with the power converter between the first terminal and the battery unit along the discharging path, the first current limiter being a diode configured to limit the charging power along the discharging path; and a second current limiter electrically coupled between the power converter and the battery unit along the charging path, the second current limiter being configured to limit the charging power to the battery unit along the charging path, wherein the power converter and the first current limiter are each electrically coupled between the first terminal and the battery unit such that the charging power and the discharging power must each pass through only one of the power converter and the first current limiter, wherein the power converter is a direct current to direct current (DC-DC) converter that is configured to convert the charging power to have a charging voltage corresponding to the battery unit, and wherein the first and second terminals are configured to be electrically coupled to a generator and a starter motor.

3. The battery pack of claim 1, wherein the power converter comprises a switching element configured to be controlled by pulse-width modulation corresponding to a state of the battery unit.

4. The battery pack of claim 1, wherein the power converter comprises at least one diode.

5. The battery pack of claim 1, wherein the starter motor is configured to receive the discharging power, and to provide starting power for starting an engine.

6. The battery pack of claim 5, wherein the generator is configured to convert mechanical energy into electrical energy during operation of the engine, and is configured to supply the charging power to the first and second terminals.

7. The battery pack of claim 1, wherein the first current limiter comprises a plurality of diodes to lower a voltage drop.

8. The battery pack of claim 1, wherein the second current limiter comprises a resistive device.

9. The battery pack of claim 1, wherein the battery unit comprises a first battery module, a second battery module, and a third battery module electrically coupled in series.

10. The battery pack of claim 9, further comprising a bus bar comprising:
   a first bus bar electrically coupling first electrodes of the first battery module to each other;
   a second bus bar electrically coupling second electrodes of the first battery module and first electrodes of the second battery module to each other;
   a third bus bar electrically coupling second electrodes of the second battery module and first electrodes of the third battery module to each other; and
   a fourth bus bar electrically coupling second electrodes of the third battery module to each other.

11. The battery pack of claim 10, further comprising a connecting terminal extending to an outside of a cover of the battery pack.

12. The battery pack of claim 11, wherein the connecting terminal comprises:
   a first connecting terminal electrically coupled to the first bus bar;
   a second connecting terminal electrically coupled to the second bus bar;
   a third connecting terminal electrically coupled to the third bus bar; and
   a fourth connecting terminal electrically coupled to the fourth bus bar.

13. The battery pack of claim 9, wherein each of the battery modules comprises:
   a plurality of battery cells;
   a restrainer configured to surround a first end portion of the battery cells of the battery module and both lateral surfaces of the battery cells of the battery module; and
   an end plate configured to be coupled to the restrainer at a second end portion of the battery cells of the battery module.

14. The battery pack of claim 13, wherein the end plate comprises flange portions having a wing shape on two lateral surfaces of the end plate, the flange portions being configured to be coupled to respective end portions of the restrainer by a coupling member.

15. The battery pack of claim 9, further comprising:
   a base frame; and
   a position aligning unit on the base frame, the position aligning unit corresponding to one of the battery modules.

16. The battery pack of claim 15, wherein the position aligning unit is configured to isolate neighboring ones of the battery modules from each other with an isolation gap therebetween.

17. The battery pack of claim 1, wherein the power converter comprises a bidirectional converter further configured to convert the discharging power to have a discharging voltage corresponding to the first terminal and to convert the charging power from the first terminal to have a charging voltage corresponding to the battery unit.

18. The battery pack of claim 1, wherein the first current limiter comprises a diode.

* * * * *